(12) United States Patent
Sasakawa et al.

(10) Patent No.: US 8,259,993 B2
(45) Date of Patent: Sep. 4, 2012

(54) BUILDING SHAPE CHANGE DETECTING METHOD, AND BUILDING SHAPE CHANGE DETECTING SYSTEM

(75) Inventors: Tadashi Sasakawa, Kawasaki (JP); Lin Zhu, Chiba (JP)

(73) Assignee: Pasco Corporation, Tokyo (JP)

( * ) Notice: Subject to any disclaimer, the term of this patent is extended or adjusted under 35 U.S.C. 154(b) by 1028 days.

(21) Appl. No.: 12/224,993

(22) PCT Filed: Mar. 13, 2007

(86) PCT No.: PCT/JP2007/054888
§ 371 (c)(1),
(2), (4) Date: Sep. 11, 2008

(87) PCT Pub. No.: WO2007/108357
PCT Pub. Date: Sep. 27, 2007

(65) Prior Publication Data
US 2009/0067725 A1 Mar. 12, 2009

(30) Foreign Application Priority Data
Mar. 17, 2006 (JP) .................................. 2006-074639

(51) Int. Cl.
*G06K 9/00* (2006.01)
(52) U.S. Cl. .......................... 382/100; 382/199; 382/286
(58) Field of Classification Search ........... 382/100–325
See application file for complete search history.

(56) References Cited

U.S. PATENT DOCUMENTS

| | | | |
|---|---|---|---|
| 4,876,651 A * | 10/1989 | Dawson et al. | 701/454 |
| 4,984,279 A * | 1/1991 | Kidney et al. | 382/113 |
| 5,864,632 A * | 1/1999 | Ogawa et al. | 382/113 |
| 6,963,662 B1 | 11/2005 | LeClerc et al. | |
| 7,583,275 B2 * | 9/2009 | Neumann et al. | 345/633 |
| 2003/0014224 A1 | 1/2003 | Guo et al. | |
| 2006/0215027 A1 | 9/2006 | Nonoyama et al. | |

FOREIGN PATENT DOCUMENTS

EP 1 205 879 A2 5/2002
(Continued)

OTHER PUBLICATIONS

Fischer et al., "Extracting Buildings from Aerial Images Using Hierarchical Aggregation in 2D and 3D," Computer Vision and Image Understanding, vol. 72, No. 2, Nov. 1998, pp. 185-203.

(Continued)

*Primary Examiner* — Manav Seth
(74) *Attorney, Agent, or Firm* — Oliff & Berridge, PLC

(57) ABSTRACT

There is provided a system for detecting a shape change of a building based upon an aerial photograph taken by an airplane. The system can process the aerial photograph without waiting for the airplane to land. On the airplane, edges are extracted directly from a central projected photographed image to be transmitted wirelessly to a ground station. This ground station extracts segments from the edges to thereby determine a shape of the building in the photographed image. On the other hand, the ground station generates a projected image of the building, which is obtained by central projecting existing three-dimensional data from a flying position of the airplane, and matches the projected image and the shape of the building obtained from the photographed image. According to a similarity between the two through the matching, it is decided whether or not the shape of the building has changed from the time of registration of the existing three-dimensional data.

6 Claims, 11 Drawing Sheets

FOREIGN PATENT DOCUMENTS

| | | |
|---|---|---|
| FR | 2 739 707 A1 | 4/1997 |
| JP | A 5-181411 | 7/1993 |
| JP | A-09-101742 | 4/1997 |
| JP | A-11-328378 | 11/1999 |
| JP | A-2004-198530 | 7/2004 |
| WO | WO 2004/113836 A1 | 12/2004 |

OTHER PUBLICATIONS

Extended Search Report issued in corresponding European Application No. 07738360.2, dated Sep. 20, 2010.

* cited by examiner

FIG.9
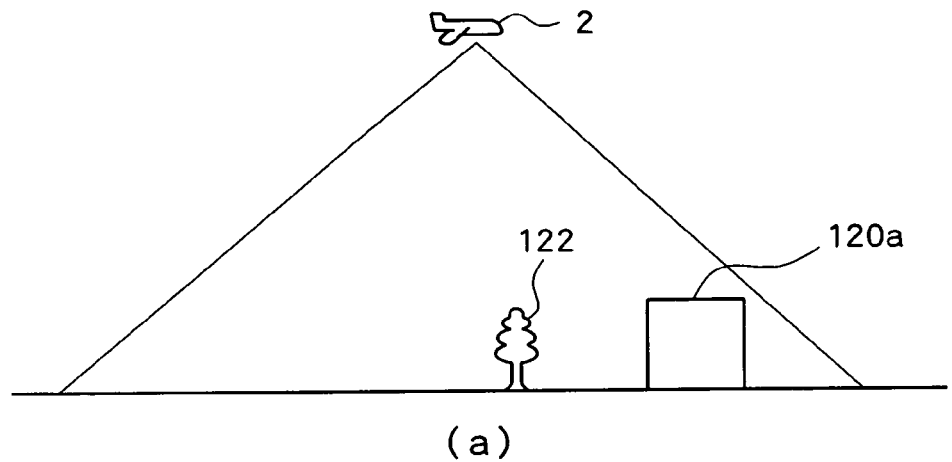
(a)
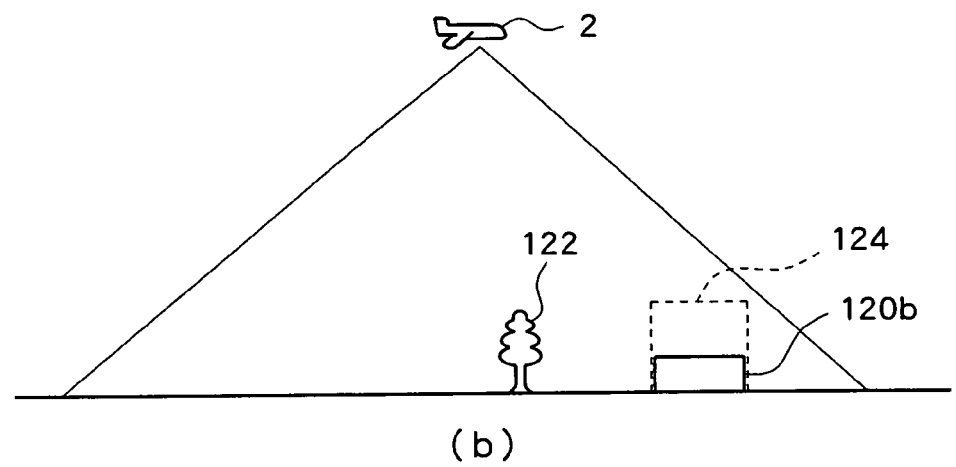
(b)
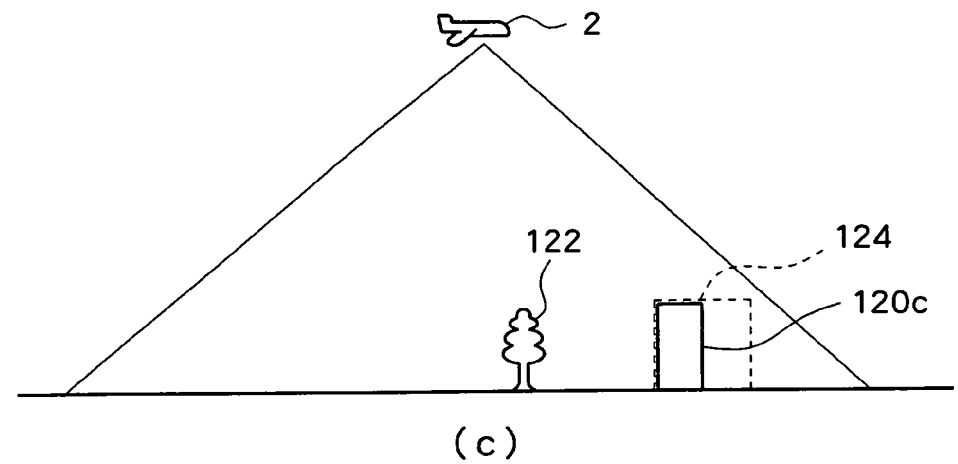
(c)

FIG. 10
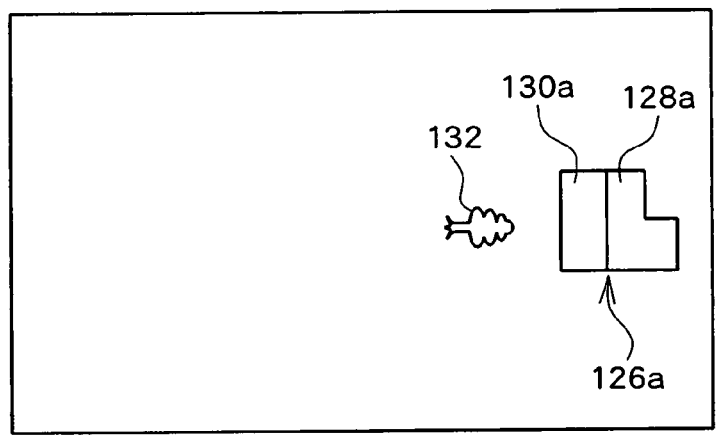
(a)
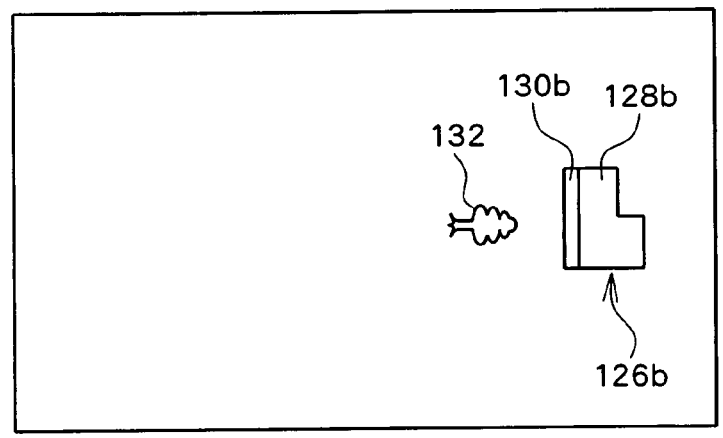
(b)
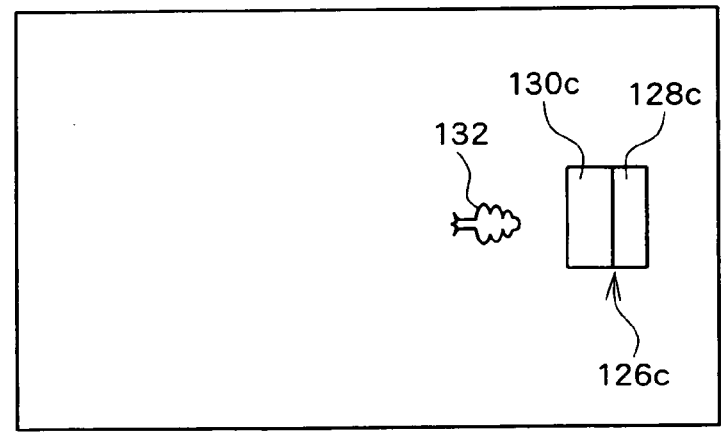
(c)

FIG.11
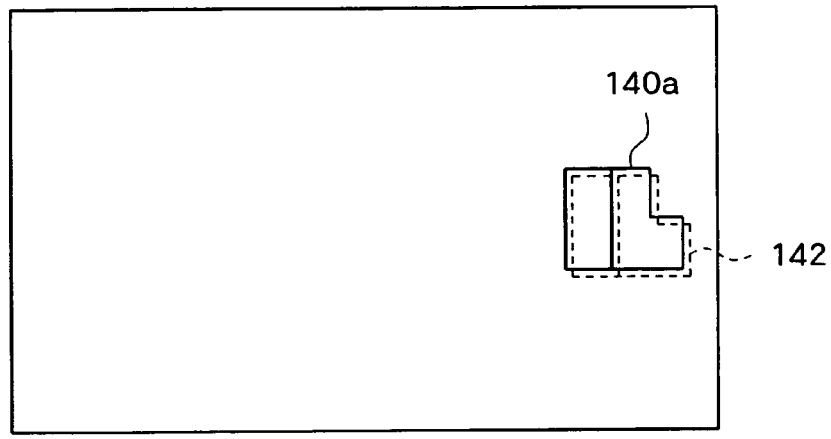
(a)
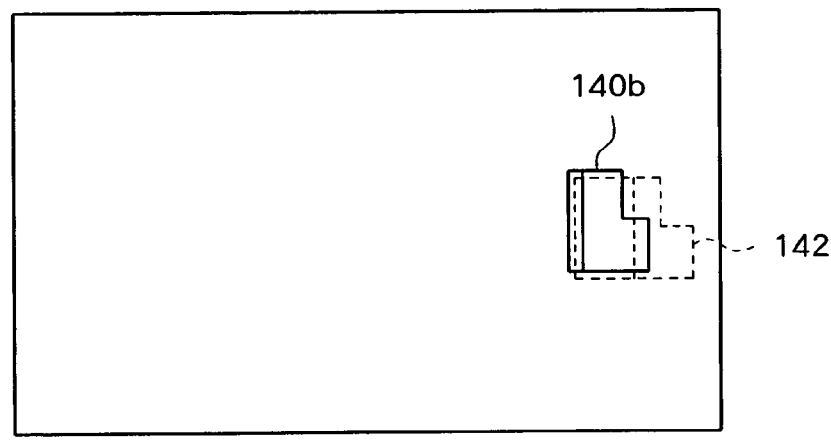
(b)
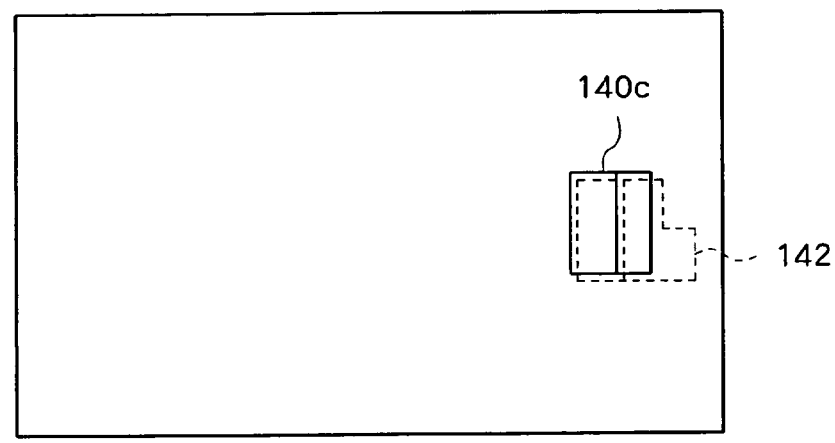
(c)

BUILDING SHAPE CHANGE DETECTING METHOD, AND BUILDING SHAPE CHANGE DETECTING SYSTEM

TECHNICAL FIELD

The present invention relates to a method and a system which detects changes in shapes of ground objects such as buildings based upon images photographed from airframe.

BACKGROUND ART

On airframe such as aircraft, images (aerial photographs) of the ground surfaces have been acquired by operating frame sensor type digital cameras, and then, changes of buildings have been detected based upon the acquired aerial photographs. Recently, technical ideas have been considered whereby, for example, disaster-affected situations where disasters such as earthquakes happen to occur can be grasped based upon detection results of changes in building shapes by utilizing the above-mentioned aerial photographs.

Conventionally, while aerial image data are stored in a data recording unit mounted on an airplane, the stored aerial image data are transferred to a data processing apparatus installed on the ground after the landing of the aircraft as to be processed and analyzed. The data processing apparatus installed on the ground compares and identifies an image of the ground surface which has been newly acquired with the existing image of the ground surface, to detect a change in shapes of a building.

As image comparing/identifying methods, a method of comparing aerial images with each other, a method of comparing feature points of an ortho-image with building polygon data, a method of comparing digital surface models (DSMs) with each other, and the like, have been devised.

FIG. 12 is a flow chart for describing the method of comparing the aerial images with each other. In this method, a registration (position adjustment) is performed between an aerial image which has been newly acquired and the existing aerial image which has been acquired in the past, and then detection of whether or not a building on the ground is present, and another detection of a change in shapes of the building, are performed based upon a change in luminance information between both the aerial images.

FIG. 13 is a flow chart for describing the method of comparing the feature point of the ortho-image with the building polygon data. In the above-mentioned method, firstly, an aerial image is ortho-corrected so as to produce an ortho-image. While an aerial image photographed using a frame sensor type digital camera corresponds to a central projected image, the central projected image has distortion that becomes larger toward a peripheral area of the photographed image. The ortho-correction corrects this distortion so as to produce an ortho-image which corresponds to such an ortho projected image that a ground surface is viewed from right above this ground surface. Subsequently, feature point extraction processing and the like are performed with respect to the produced ortho-image so as to extract a contour of a building (or a portion of this building), which presently appears on the ortho-image. The extracted contour is compared with such a contour of the building which is obtained from existing building polygon data and is viewed from directly above this building, and hence a change of the building is detected.

FIG. 14 is a flow chart for describing the method of comparing DSMs with each other. In this method, a DSM is produced from an aerial image, and then a difference between the produced DSM and an existing DSM is calculated so as to detect a change of a building. While a DSM corresponds to height information about a ground surface, in such a case where this DSM is produced from an aerial image, for instance, a plurality of aerial images from different flying positions are identified with each other, and then a height of a ground object is obtained based upon apparent differences between the plurality of aerial images for the same ground object.

DISCLOSURE OF THE INVENTION

Problems to be Solved by the Invention

When aerial images are utilized in order, for example, to grasp situations on the ground in a time of disaster, instantaneousness is required. In view of this utilization purpose, it is necessary to process the aerial images without waiting for aircraft to land.

However, data amounts of digital images photographed on the aircraft can be considerably large, while transmission capacities between the aircraft and the ground are relatively small. As a result, there is a practical problem that it is difficult to directly transmit the acquired image data from the aircraft to the ground in a wireless manner.

Also, in the method of comparing the aerial images with each other, it becomes more difficult to perform the registration with high precision as the resolution of the images becomes higher. Further, the change detecting operation based upon the luminance information between the images has problems in that: a detection ratio is low; and a change detection is limited only for a planar change, and a change in a height direction cannot be detected.

In the method of comparing the ortho-image feature point with the building polygon data, there is a problem that a processing load required to produce the ortho-image is heavy, and hence the processing has been difficult to realize with the limited processing capacity of the apparatus mounted on the airplane. Also, the change detection made by comparing the extracted contour with the existing building polygon data has another problem that this change detection is limited to only a planar change.

In the method of comparing the DSMs with each other, there is a problem that the load required for producing the DSMs is heavy, and hence, the processing has been difficult to realize with the limited processing capacity of the apparatus mounted on the airplane.

The present invention has been made to solve the above-mentioned problems, and therefore, has an object to provide a building shape change detecting method and a building shape change detecting system, with which a processing load for images photographed on an aircraft can be reduced, and accordingly, since a data amount required for the processing can be reduced, the reduced data can be readily transmitted in a wireless manner from the flight vehicle to the ground, and thus processing for detecting changes in building shapes can be progressed on the ground without waiting for the aircraft to land.

Means for Solving the Problems

A building shape change detecting method according to the present invention includes: an observation feature point extracting step of extracting an observation feature point corresponding to a shape of a building from a photographed ground surface image which has been photographed on an aircraft; a building projected image producing step of performing a projection calculation based upon building shape recording information which has previously been stored, and both a flying position and a flying attitude of the aircraft when the photographed ground surface image is photographed so as to produce a building projected image which is viewed from the flying position; and a change detecting step of comparing the observation feature point with the building projected image so as to detect a change in shapes of the building.

A building shape change detecting system according to the present invention includes: observation feature point extracting means for extracting an observation feature point corresponding to a ground object from a photographed ground surface image which has been photographed on a aircraft; building projected image producing means for performing a projection calculation based upon building shape recording information which has previously been stored, and both a flying position and a flying attitude of the aircraft when the photographed ground surface image is photographed so as to produce a building projected image which is viewed from the flying position; and change detecting means for comparing the observation feature point with the building projected image so as to detect a change in shapes of the building.

According to the present invention, the feature point extracting processing is executed with respect to the photographed ground surface image corresponding to the central projected image. Since the ortho-correction processing and the like are not executed, the observation feature point is extracted under a light processing load. Also, the observation feature point can be expressed by employing a smaller data amount than the data amount of the original photographed ground surface image. A position of the feature point corresponding to the central projected image along a projection direction is determined according to a height corresponding to this feature point. In other words, while the position of the feature point along the projection direction contains height information, changes in height of this feature point can be detected by comparing the observation feature point with the building projected image, and hence a three-dimensional change in building shapes can be detected.

Another building shape change detecting method according to the present invention includes: a photographing step of photographing a photographed ground surface image from an aircraft; an observation feature point extracting step of extracting an observation feature point corresponding to a ground object from the photographed ground surface image on the aircraft; a data transmitting step of transmitting data representative of the observation feature point from the aircraft to a ground station in a wireless manner; a building projected image producing step of performing a projection calculation at the ground station, based upon building shape recording information which has been previously stored, and both a flying position and a flying attitude of the aircraft when the photographed ground surface image is photographed so as to produce a building projected image which is viewed from the flying position; and a change detecting step of comparing the observation feature point with the building projected image at the ground station so as to detect a change in shapes of the building.

Another building shape change detecting system according to the present invention includes: photographing means for photographing a photographed ground surface image from an aircraft; observation feature point extracting means for extracting an observation feature point corresponding to a ground object from the photographed ground surface image on the aircraft; data transmitting means for transmitting data representative of the observation feature point from the aircraft to a ground station in a wireless manner; building projected image producing means for performing a projection calculation at the ground station, based upon building shape recording information which has previously been stored, and both a flying position and a flying attitude of the aircraft when the photographed ground surface image is photographed so as to produce a building projected image which is viewed from the flying position; and change detecting means for comparing the observation feature point with the building projected image at the ground station so as to detect a change in shapes of the building.

According to the present invention, after the observation feature point extracting processing capable of reducing the data amount under the relatively light processing load is carried out on the aircraft, the wireless transmission from the aircraft to the ground station is carried out. As a consequence, the processed data can be quickly transmitted to the ground station during the aircraft flight.

In the building shape change detecting method according to the present invention: the observation feature point extracting step may extract a pixel as the observation feature point, which constitutes an edge, from the photographed ground surface image corresponding to a digital image; the building shape recording information may contain three-dimensional data of the building; the building projected image producing step may produce a projected image of a contour of the building based upon the three-dimensional data; and the change detecting step may detect both a change in planar shape of the building and a change in height of the building based upon a matching operation executed between the edge extracted from the photographed ground surface image and the projected image.

The change detecting step may detect the change in height of the building based upon a difference between a position of the projected image of the building in the building projected image, and a position of an image of the building in the photographed ground surface image along a projection direction related to the projected image.

In the building shape change detecting system according to the present invention: the observation feature point extracting means may extract a pixel as the observation feature point, which constitutes an edge, from the photographed ground surface image corresponding to a digital image; the building shape recording information may contain three-dimensional data of the building; the building projected image producing means may produce a projected image of a contour of the building based upon the three-dimensional data; and the change detecting means may detect both a change in planar shape of the building and a change in height of the building based upon a matching operation executed between the edge extracted from the photographed ground surface image and the projected image.

The change detecting means may detect the change in height of the building based upon a difference between a position of the projected image of the building in the building projected image, and a position of an image of the building in the photographed ground surface image along a projection direction related to the projected image.

Effect of the Invention

The building shape change detecting method and the building shape change detecting system, according to the present invention, can reduce the data amount and can lower the processing load. Also, the information acquired from the aircraft is quickly transmitted to the ground station so as to be processed, and hence, instantaneousness related to shape change detections for buildings and the like can be improved.

BRIEF DESCRIPTION OF THE DRAWINGS

FIG. 9 is a schematic diagram showing a positional relationship between the airplane and a building, and shapes of the building and the like, as viewed from a horizontal direction.

FIG. 10 is a schematic diagram showing a feature point image which is transmitted from the airplane.

FIG. 11 is a schematic diagram representing a subject projected image of a building, which is produced from existing three-dimensional data, and an extracted photographed image of the building, which is extracted from either a segment image or a contour image.

BEST MODE FOR CARRYING OUT THE INVENTION

Figure 1:
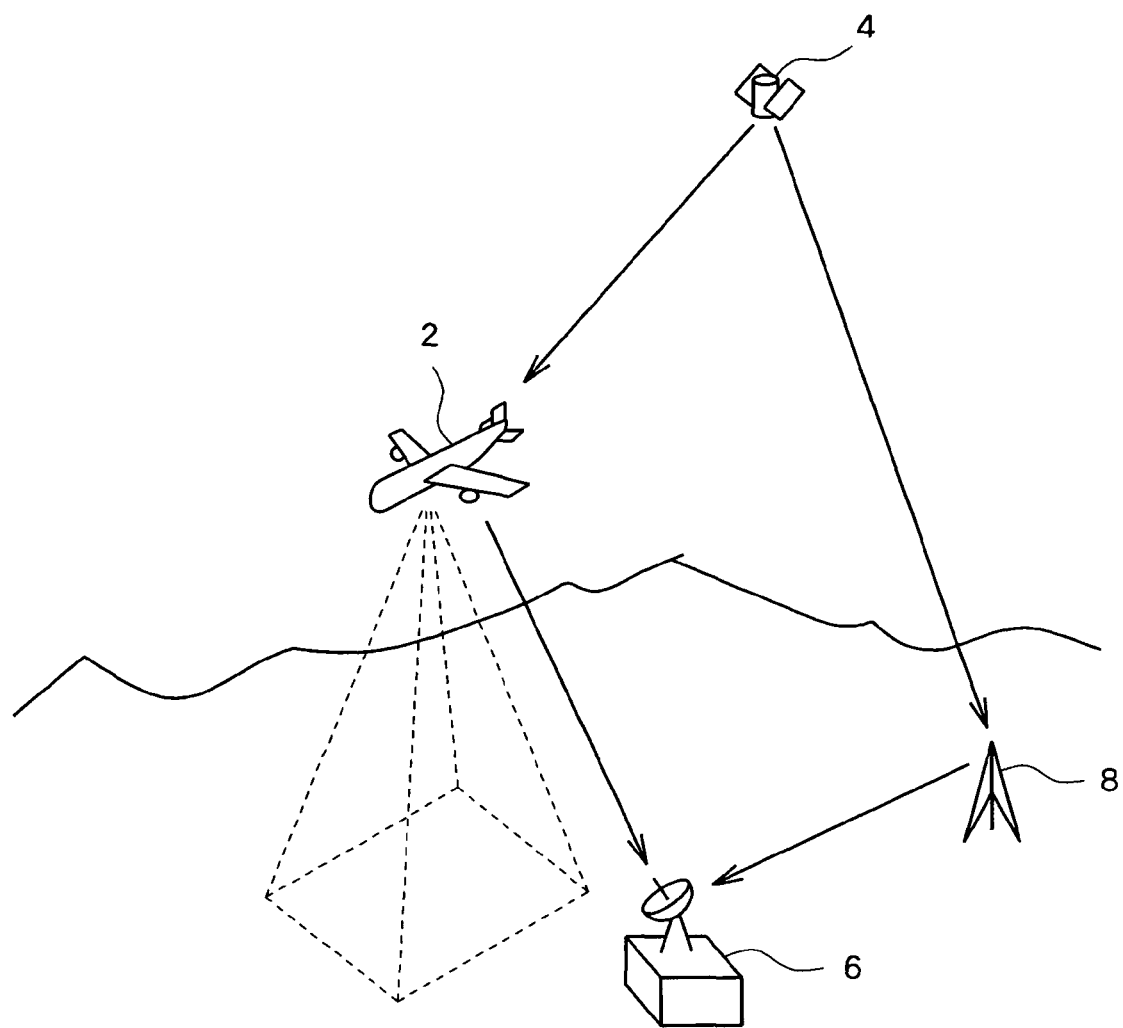
FIG. 1 is a schematic diagram schematically showing an arrangement of a building shape change detecting system according to an embodiment mode of the present invention.

Referring now to the drawings, description is given of embodiment modes of the present invention.

The present embodiment mode is a building shape change detecting system for detecting a shape change of a building located on a ground surface, which is realized by employing a ground surface shape change detecting method according to the present invention. The building shape change detecting system is effective, for instance, in order for situations such as collapses and displacement of buildings which may possibly occur when a disaster such as an earthquake happens to be rapidly ascertained, and then, the ascertained information is utilized in relief/restoration activities.

FIG. 1 is a schematic diagram showing a schematic arrangement of the building shape change detecting system. An airplane 2 is fitted with a digital camera so as to photograph an image of the ground surface, while the airplane 2 flies over the ground. Also, the airplane 2 fitted with a global positioning system/inertial measurement unit (GPS/IMU) so as to measure and record positions, inclinations, and the like of the digital camera mounted on the airplane 2 based upon signals transmitted from a GPS satellite 4, and inertial force applied to the airplane 2. As a result, positions and attitudes of the digital camera when images of the ground surface are photographed can be ascertained by the airplane 2.

The airplane 2 performs processing for extracting a feature point of a digital image acquired on the airplane 2, and transmits both data extracted for the feature point, and data acquired from the GPS/IMU to a ground station 6 in a wireless manner. The ground station 6 performs processing for detecting a shape change of a building based upon the feature point data transmitted from the airplane 2. While a reference station 8 has previously ascertain its position in a correct manner, the reference station 8 calculates an error between the position acquired from a GPS and a true position, and then provides this calculated error as differential information (correction value) to a user of the GPS. When the ground station 6 calculates an image photographed position based upon the GPS/IMU data acquired by the airplane 2, the ground station 6 can correct the image photographed position by utilizing this differential information.

Figure 2:
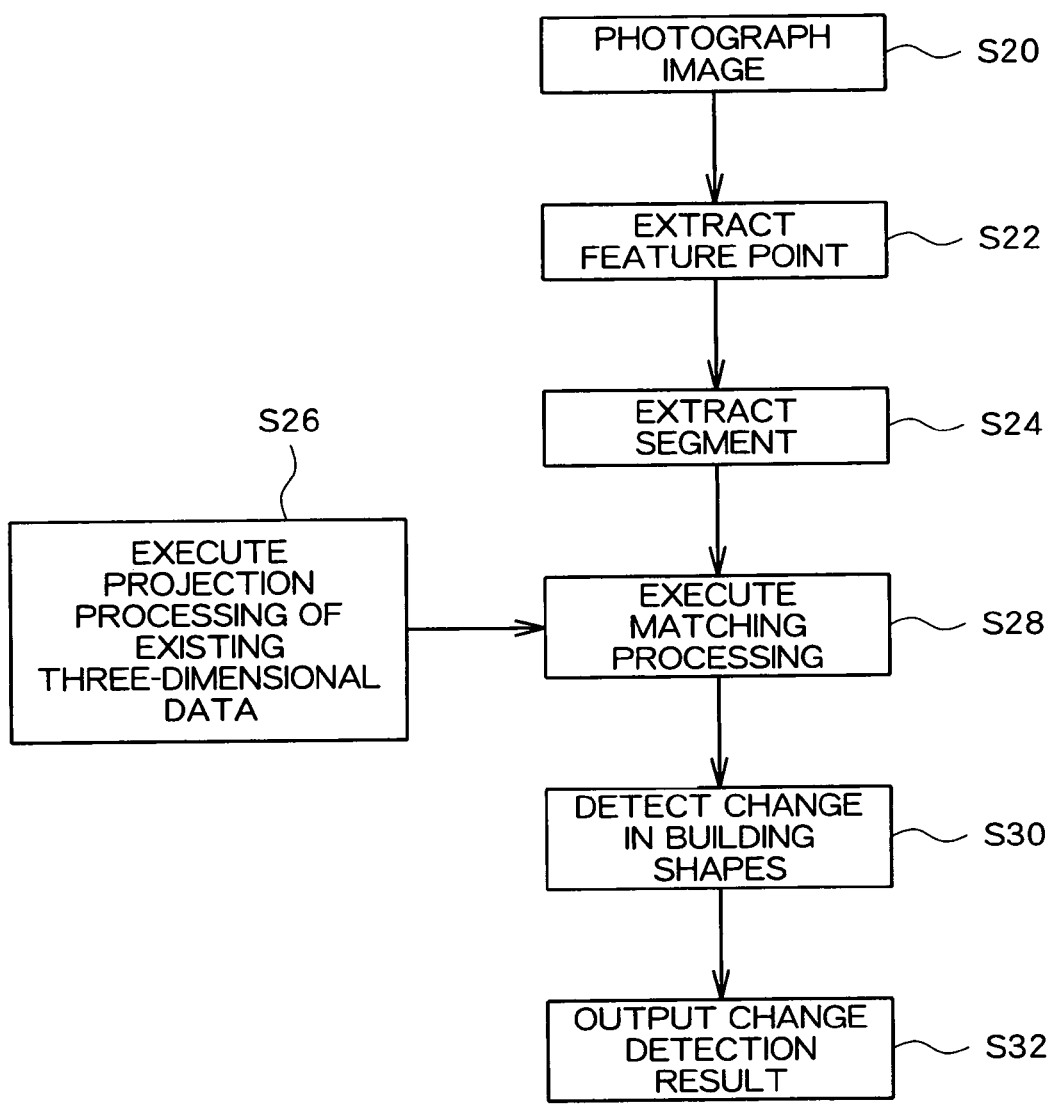
FIG. 2 is a flow chart representing a schematic processing flow operation of the building shape change detecting system according to the embodiment mode of the present invention.

FIG. 2 is a flow chart schematically showing processing flow of the building shape change detecting system. In the flow chart, a ground surface image is photographed by the airplane 2 (Step S20), and feature points are extracted from the photographed ground surface image (Step S22). The data relating to the feature points is transmitted to the ground station 6, and then processing is carried out wherein segments are extracted from a group of the feature points so as to produce an image (segment image) constructed of the segments (Step S24). Alternatively, in addition, other processing can be carried out wherein the extracted segments are connected to each other so as to produce an image (contour image) for indicating a contour of a building. The ground station 6 projects existing three-dimensional data of the building so as to produce a projected image (building projected image) of the contour of the building (Step S26). The ground station 6 executes matching processing between this building projected image and an extracted photograph image which has been extracted from either the line segment image or the contour image (Step S28) so as to detect a shape change of the building (Step S30), and then, outputs the detection result, for example, in a format easily recognizable by a user (Step S32).

Figure 3:
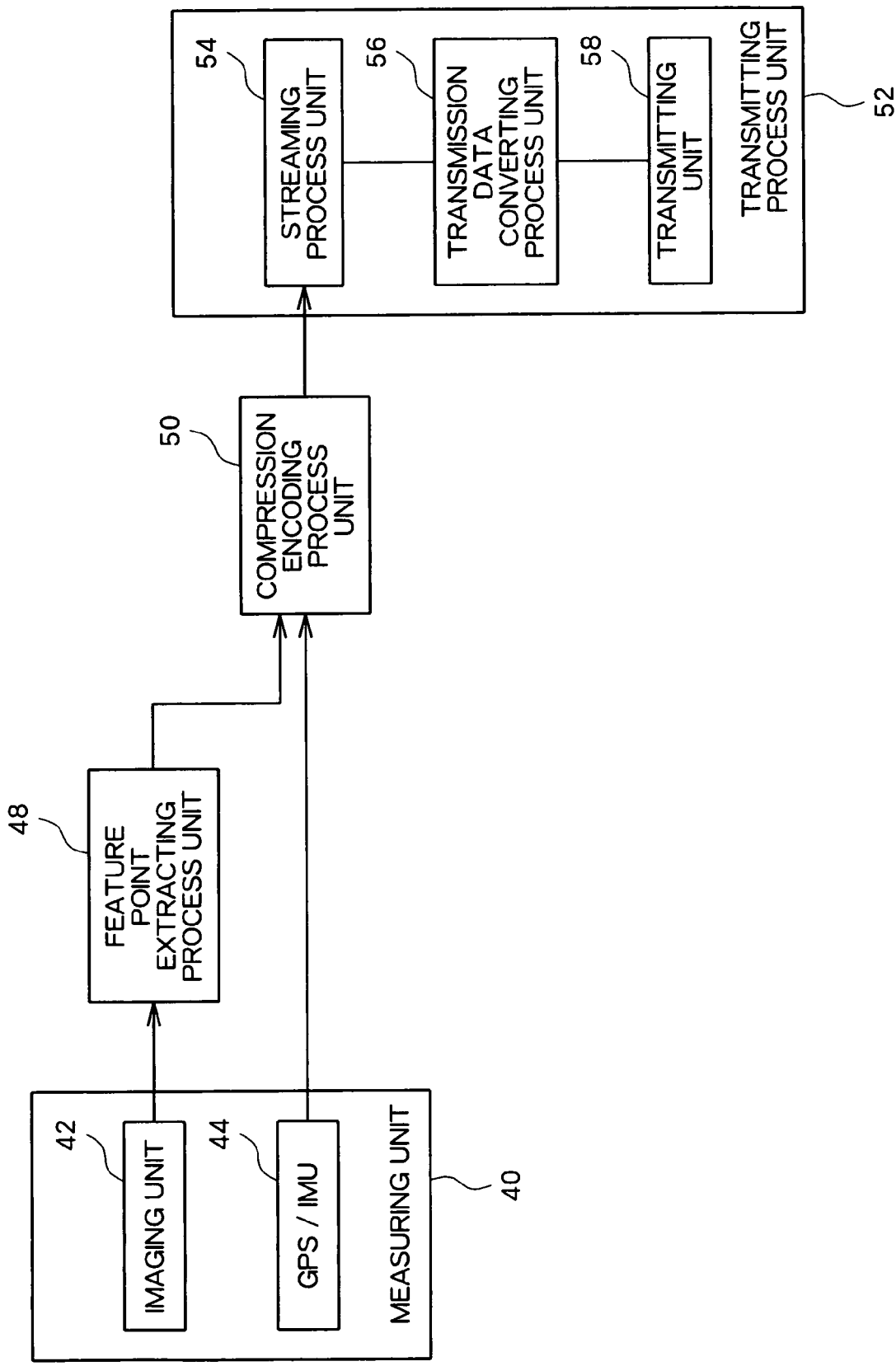
FIG. 3 is a functional block diagram schematically showing a partial arrangement of the building shape change detecting system, which is mounted on an airplane.

FIG. 3 is a functional block diagram for schematically showing a partial arrangement of the building shape change detecting system, which is mounted on the airplane 2. In the functional block diagram, a measuring unit 40 is equipped with an imaging unit 42, and a GPS/IMU 44. The imaging unit 42 contains a digital camera for photographing an image of a ground surface. The digital camera is constructed by employing a frame sensor, or can alternatively be constructed by employing a line sensor so as to acquire an image. The data of the photographed ground surface image is output to a feature point extracting process unit 48. The feature point extracting process unit 48 extracts pixels as an observation feature point, and then outputs the observation feature point to a compression encoding process unit 50. The pixels constitute an edge of an image of a ground object such as a building which appears on the image.

The GPS/IMU 44 receives a GPS signal from the GPS satellite 4, measures acceleration of the airplane 2 by the IMU, and produces GPS/IMU data which indicates a position and an attitude of the airplane 2 based thereon, thereby outputting the produced GPS/IMU data to the compression encoding process unit 50.

The compression encoding process unit 50 performs compression encoding processing with respect to the data related to the feature point supplied from the feature point extracting process unit 48 and the GPS/IMU data supplied from the GPS/IMU 44, and hence, an amount of data which should be transmitted by a transmitting process unit 52 is compressed.

The transmitting process unit 52 is arranged by containing a streaming process unit 54, a transmission data converting process unit 56, and a transmitting unit 58. The transmitting process unit 52 receives the compression-encoded data from the compression encoding process unit 50, and then transmits the processed data wirelessly to the ground station 6. The streaming process unit 54 performs such a processing with respect to the data, by which the ground station 6 can perform a streaming operation of analyzing data while this data is being transmitted. Subsequently, in the transmission data converting process unit 56, a carrier wave shaping operation is carried out, and then the wave-shaped carrier wave is transmitted from the transmitting unit 58 as a wireless signal.

Figure 4:
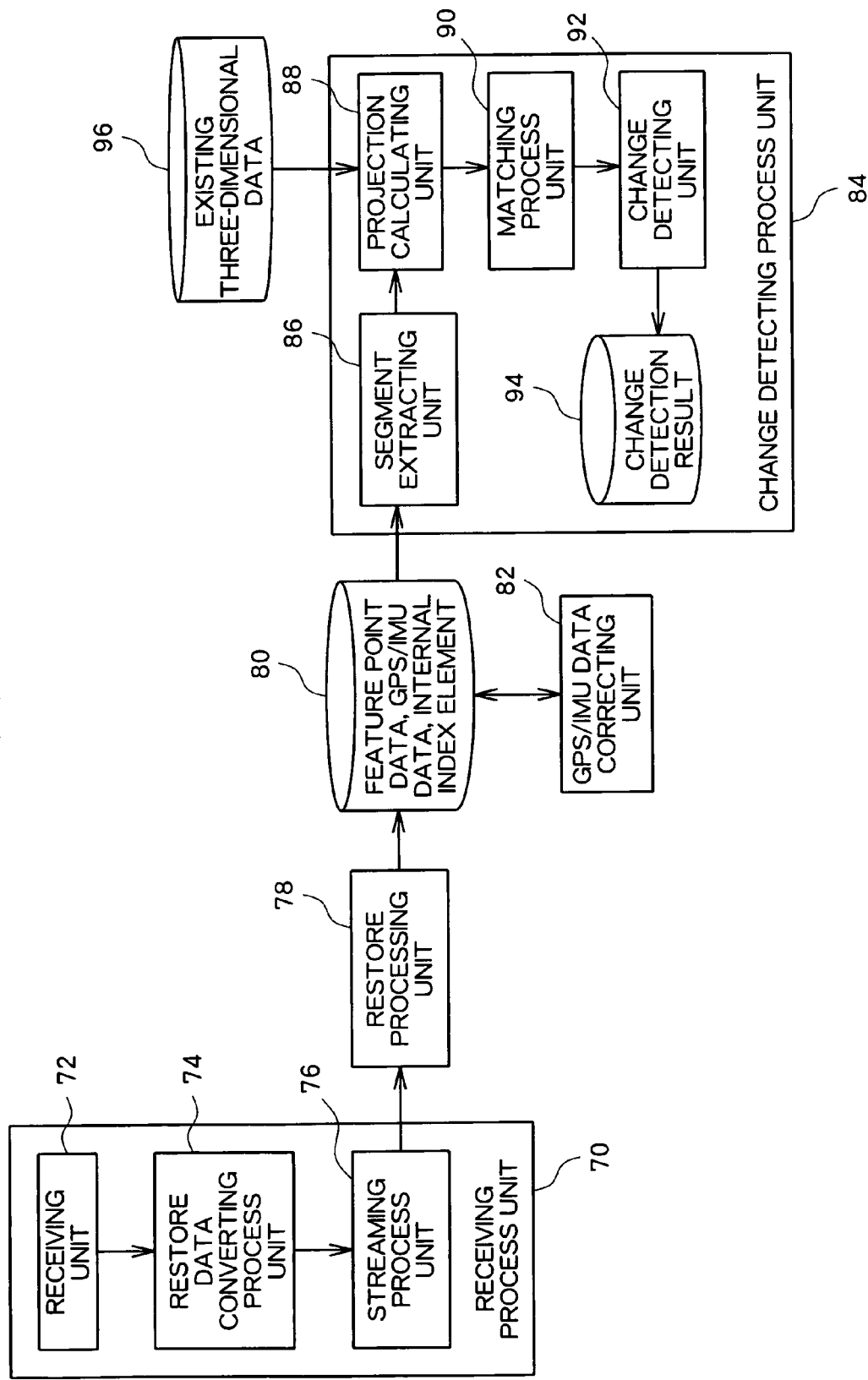
FIG. 4 is a functional block diagram schematically showing a partial arrangement of the building shape change detecting system, which is provided on a ground station.

FIG. 4 is a functional block diagram schematically showing a partial arrangement of the building shape change detecting system, which is provided in the ground station 6. A receiving process unit 70 is provided and contains a receiving unit 72, a restore data converting process unit 74, and a streaming process unit 76. The receiving process unit 70 performs processing in response to the transmitting process unit 52 provided on the side of the airplane 2 so as to receive transmission data such as the feature point data and the GPS/IMU data from the wireless signal transmitted from the airplane 2.

A restore processing unit 78 performs processing so that the reception data which has been compression-encoded by the compression encoding process unit 50 is decoded and expanded so as to restore the data, and then stores a file 80 in a storage unit (not shown). In the file 80, the processed feature point data and the processed GPS/IMU data have been saved. Also, interior orientation parameters such as a focal length and a principal point position of the digital camera have been previously stored in the file 80.

A GPS/IMU data correction unit 82 executes correction processing with employment of the differential information acquired by the reference station 8 with respect to the GPS/IMU data stored in the storage unit.

A change detecting process unit 84 executes processing so that a ground surface range corresponding to an image photographed by the airplane 2 is specified by employing the interior orientation parameters and the GPS/IMU data stored in the storage unit, and a shape change of a building within the relevant range is detected. The change detecting process unit 84 contains a segment extracting unit 86, a projection calculating unit 88, a matching process unit 90, and a change detecting unit 92, and outputs the acquired change detection result to a file 94 of the storage unit. In order to execute processing in the projection calculating unit 88, existing three-dimensional data of buildings are employed, which have been saved in a database 96.

Next, a description is further given of the feature point extracting processing executed on the airplane 2, and the respective processing of the change detecting process unit 84 executed in the ground station 6.

Figure 5:
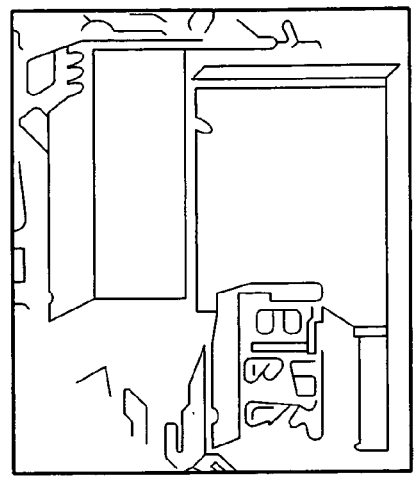
FIG. 5 is a schematic diagram showing one example of a feature point image which is obtained as an output of a feature point extracting process unit.

On the airplane 2, the imaging unit 42 photographs either a color image of the ground surface or a monochromatic image thereof. The feature point extracting process unit 48 extracts as a feature point a group of pixels which constitute an edge based upon a change in luminance and a change in colors within this photographed image. The extracting operation of the edge can be carried out by employing various sorts of edge filters. For example, while a Canny filter is employed as the edge filter, a position of an edge is extracted, and such a line narrowing processing for detecting the edge by a single pixel can be carried out. It should be noted that the feature point extracting process unit 48 can be arranged as follows. Before the feature point extracting processing is carried out, a digital image is emphasized by performing, for example, a histogram smoothing processing. As a result, the feature point extracting processing can be more appropriately carried out. FIG. 5 is a schematic diagram showing one example (feature point image) in which the feature point data acquired as the output of the feature point extracting process unit 48 is represented as an image. In a digital image acquired by the imaging unit 42, each of the pixels thereof has a luminance value and an RGB value, and each of these values is expressed by binary data having a plurality of bits. In contrast, each pixel contained in a feature point image represents a difference representing whether or not each pixel corresponds to a feature point, and the relevant image is basically expressed as a binary-processed image. As a consequence, a data amount of this feature point image is significantly reduced, compared with a data amount of an original image.

Also, the above-mentioned feature point image can be further encoded in the compression encoding process unit 50, and hence, the data amount thereof can be compressed. For instance, as previously described, since a feature point image is basically a binary-processed image, this feature point image can be compressed with a higher efficiency by employing run length encoding, and the like. As previously described, since the data amount is compressed, even in a case where capacity of a wireless transmission path established between the airplane 2 and the ground station 6 is relatively small, the data can be rapidly transmitted to the ground station 6 at the same time as data is produced on the airplane 2 in a parallel manner without being subject to the restrictions of the above-mentioned capacity.

Figure 6:
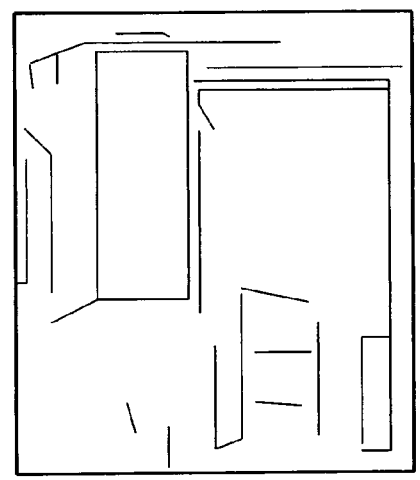
FIG. 6 is a schematic diagram showing one example of a segment image which is obtained as an output of a segment extracting unit in correspondence with the feature point image of FIG. 5.

In the ground station 6, a segment image is produced from the feature point image by performing segment extracting processing in the segment extracting unit 86. The segment extracting unit 86 first performs a filtering operation for executing tracking processing and a dividing processing with respect to the edge which has been extracted as a point group by the feature point extracting process unit 48 so as to divide the point group into sets of points which can be taken as one group respectively, and also remove points which do not construct a group having a large dimension, but may be taken as a noise. Next, the segment extracting unit 86 executes, for example, Hough transform so as to extract segments. In this case, a contour of a building image contains a relatively large number of straight line portions. On the other hand, there is a small possibility that edges such as a tree may form straight lines, which are not handled as a detection subject in the building shape change detecting system. As a consequence, since the above-mentioned segment extracting processing is carried out, the edges of the building image can be mainly derived. FIG. 6 is a schematic diagram for showing one example of a segment image which is obtained as the output of the segment extracting unit 86 in correspondence with the feature point image of FIG. 5.

Figure 7:
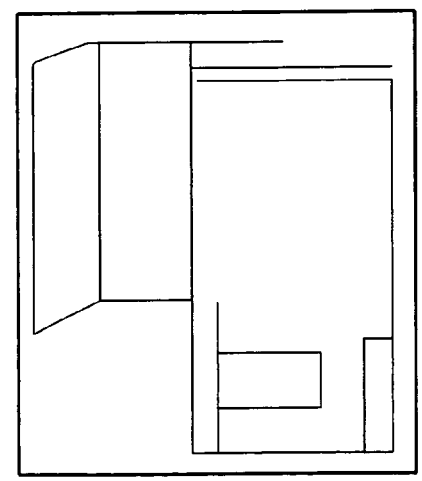
FIG. 7 is a schematic diagram representing one example of a contour image which is obtained in correspondence with the segment image shown in FIG. 6.

Also, the change detecting process unit 84 may be alternatively arranged in order to execute processing where the Perceptual Grouping technique is applied to a segment image produced by the segment extracting unit 86 so as to extract a contour of a building, and thus a contour image is produced. FIG. 7 is a schematic diagram showing one example of a contour image which is obtained in correspondence with the segment image shown in FIG. 6. Among a plurality of segments appearing in the segment image, segments which constitute a contour of the same building are found, and then these found segments are connected to each other, and hence the contour is constructed.

The above-mentioned segment image or the contour image has been produced without performing the ortho-transform. In other words, these images have been produced by basically extracting either edges or contours of a building in a central projected image. The projection calculating unit 88 derives the interior orientation parameters such as the focal length and the principal position of the digital camera from the file 80, and similarly acquires the corrected GPS/IMU data as exterior orientation parameters from the file 80. The projection calculating unit 88 performs a projection calculation based upon the interior orientation parameters, the exterior orientation parameters, and the existing three-dimensional data of the building saved in the database 96, and hence an image (building projected image) where the building has been projected (central projected) on the photographed image is produced under the same conditions as when an image which constitutes a source of the feature point image is photographed. In this case, the building projected image implies a contour image corresponding to a set of coordinate values which have been obtained by executing a projection calculation based upon the coordinate values of the existing three-dimensional data.

Figure 8:
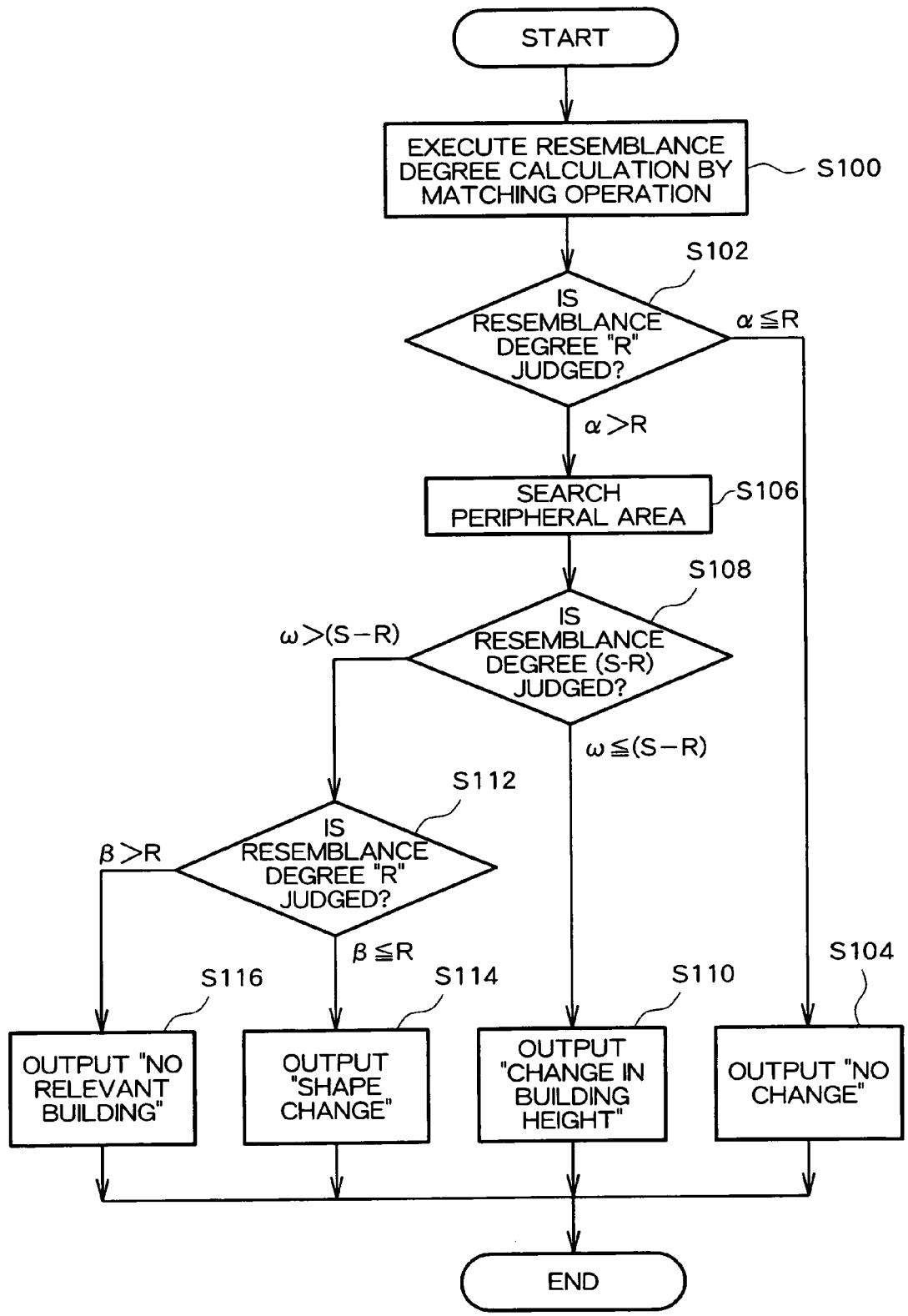
FIG. 8 is a flow chart describing a summary of processes executed in a matching process unit and a change detecting unit.
Figure 12:
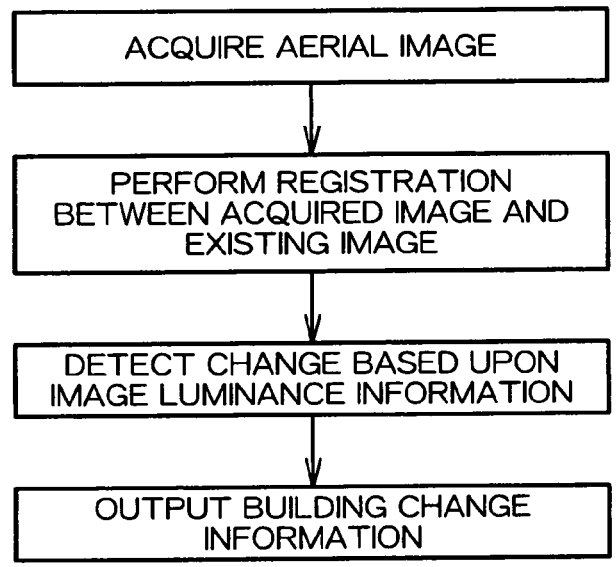
FIG. 12 is a flow chart describing the method for comparing aerial images with each other, which corresponds to the conventional method.
Figure 13:
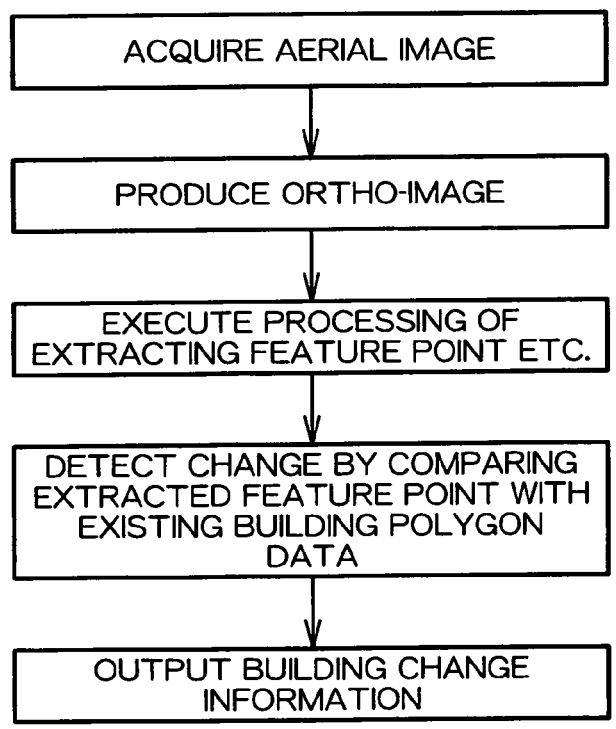
FIG. 13 is a flow chart describing the method for comparing the feature point of the ortho-image with the building polygon data, which corresponds to the conventional method.
Figure 14:
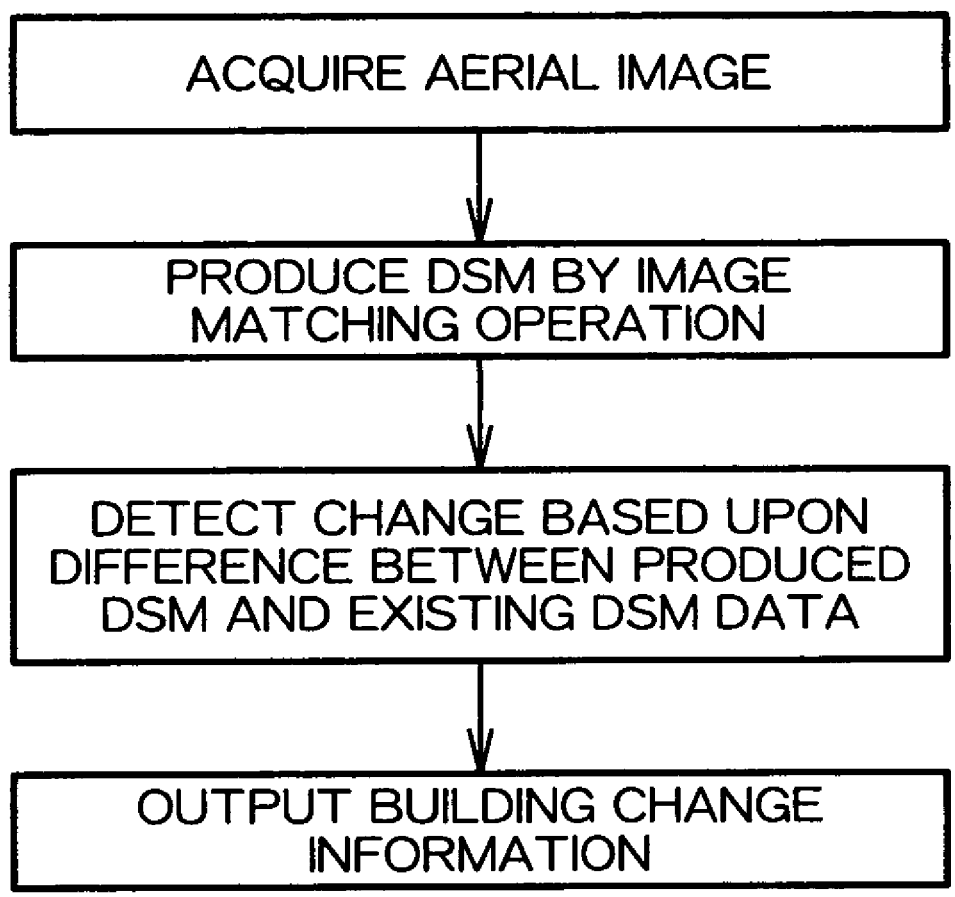
FIG. 14 is a flow chart describing the method of comparing the DSMs with each other, which corresponds to the conventional method.

The matching process unit 90 performs a matching operation between the building projected image calculated by the projection calculating unit 88 based upon the existing three-dimensional data and either the above-mentioned segment image or the contour image so as to calculate a resemblance degree as a numeral value which indicates a matching degree. The matching processing can be carried out by employing, for instance, a matching method using a Hausdorff distance. The change detecting unit 92 detects a shape change of a building based upon this resemblance degree. FIG. 8 is a flow chart for describing a summary of processes executed in the matching process unit 90 and the change detecting unit 92. The matching process unit 90 executes matching processing with respect to each of buildings which appears on a building projected image. Firstly, the matching process unit 90 compares a contour image (subject projected image) of a building (judging subject building) which constitutes a subject for the matching processing in the building projected image with either segments or contours (extracted photographed image) which appear in the same area as the subject projected image within either the segment image or the contour image so as to calculate a resemblance degree "R" therebetween (Step S100).

The change detecting unit 92 judges a large/small relation between a threshold value "$\alpha$" and the resemblance degree "R" (Step S102). In this case, the threshold value "$\alpha$" is set to a resemblance degree such that it can be regarded that the subject projected image is made coincident with the extracted photographed image. In other words, in the case where $\alpha \leq R$, the change detecting unit 92 judges that a building having the same shape as the shape of the judging subject building is located at the same position thereof on the ground, and thus makes a judgement of "no change" with respect to the shape of the judging subject building when the three-dimensional data was acquired, and when this building is presently photographed from the airplane 2, thereby outputting this judgement as a change detection result to the file 94 (Step S104).

On the other hand, in the case where $\alpha > R$, the matching process unit 90 performs a searching operation within a peripheral area (Step S106). In this case, the peripheral area is set as an area which is changed in connection with a change in height of a judging subject building within an elongated area which is elongated basically along a projection direction of a central projecting operation, namely along azimuth which is directed from a projection center to the judging subject building. The matching process unit 90 moves a matching subject area having a dimension corresponding to the dimension of the judging subject building within the set area so as to again calculate a resemblance degree (this value is assumed as "resemblance degree S"). The change detecting unit 92 judges a large/small relation between another threshold value "$\omega$" and a difference value (S−R) calculated between the resemblance degree "S" and the resemblance degree "R" (Step S108). In this case, the threshold value "$\omega$" is set to a value from which it can be judged whether or not the height of a building was changed. In a case where $\omega \leq (S-R)$, the change detecting unit 92 judges that the height of the building has changed, and then outputs this judgement result to the file 94 (Step S110).

On the other hand, in the case where $\omega > (S-R)$, that is, in a case where as a result of the searching operation within the peripheral area, an extracted building image whose difference value (S−R) becomes equal to or larger than the threshold value "$\omega$" could not be acquired (Step S108), the change detecting unit 92 judges a large/small relation between still another threshold value "$\beta$" and the resemblance degree "R" (Step S112). In this case, the threshold value "$\beta$" is set to a resemblance degree ($\alpha > \beta$) such that it can be regarded that a subject projected image is not, made coincident with an extracted photographed image. In other words, in the case where $\beta \leq R$, the change detecting unit 92 judges that a planar shape of a building has changed, and thus outputs the judgement result to the file 94 (Step S114).

On the other hand, in the case where $\beta > R$, the change detecting unit 92 judges that the relevant building is not located at the position of the judging subject building, and thus outputs a judgement of "no relevant building" as a change detection result to the file 94 (Step S116). As concrete examples of a case where the change detection result of "no relevant building" is made, the case where a building was artificially dismantled or destroyed, or where a building collapsed after a disaster such as an earthquake, can be conceived.

It should be noted that in the change detecting unit 92, a ratio of S/R can be alternatively employed instead of the difference value (S−R) between the resemblance degree "S" and the resemblance degree "R". In this case, the threshold value "$\omega$" is appropriately changed into a ratio from which it can be judged whether the height of the building was changed.

FIG. 9 to FIG. 11 are schematic diagrams for describing the above-mentioned building shape change detecting processing executed in the change detecting unit 92. FIG. 9 is a schematic diagram for representing a positional relationship between the airplane 2 and a building and the like, which are viewed from a horizontal direction, and also for showing shapes of the building and so on. The airplane 2 photographs a ground surface on which ground objects are present. In this drawing, a building 120 and a tree 122 have been indicated. FIG. 9(*a*) shows a case where there is no change in building shape, while a building 120*a* maintains a shape identical to a shape registered in the existing three-dimensional data. In contrast thereto, FIG. 9(b) shows such a case where a height of a building 120b changed, while the height of the building 120b is lower than that of a shape 124 registered in the existing three-dimensional data. Also, FIG. 9(c) shows a case where a planar shape of a building 120c changed, while a two-dimensional shape of the building 120c within the horizontal plane changed, compared with that of the shape 124 registered in the existing three-dimensional data.

FIG. 10 is a schematic diagram for indicating images of feature points transmitted from the airplane 2. FIG. 10(a) to FIG. 10(c) are the diagrams which correspond to the respective cases shown in FIG. 9(a) to FIG. 9(c). In FIG. 10(a) to FIG. 10(c), central projected images 126 of buildings and central projected images 132 of trees have been represented which are made of edges extracted as the feature points.

Further, FIG. 11 is a schematic diagram for showing contour images (subject projected images) of buildings produced from the existing three-dimensional data, and also extracted photographed images of the buildings extracted from either segment images or the contour images. FIG. 11(a) to FIG. 11(c) are diagrams which correspond to the respective cases shown in FIG. 9(a) to FIG. 9(c). In this case, the central projected images 132 of the trees which do not contain the feature point groups arrayed in a linear manner are removed by the processing executed in the segment extracting unit 86, whereas extracted photographed images 140 have been acquired in correspondence with the central projected images 126 of the partial buildings which are made of the feature point groups arrayed in the linear manner.

Then, not only a rooftop but also a side plane may appear on the central projected image of this building 120 which is positioned obliquely downward from the airplane 2. Concretely speaking, in a case where the building shape is not changed, both a rooftop 128a and a side wall plane 130a appear on a central projected image 126a of the building of the feature point image (FIG. 10(a)). For instance, as represented in the shape of the rooftop 128a of this drawing, this building originally has an "L-shaped" planar shape (two-dimensional shape).

In FIG. 11(a), an extracted photographed image 140a of the building represented by a solid line has both a shape and a position, which correspond to those of the central projected image 126a appearing on the feature point image (FIG. 10(a)). On the other hand, in FIG. 11(a), a subject projected image 142 produced from the existing three-dimensional data is represented by a dotted line. In this case where the shape of the building is not changed, a resemblance degree "R" between the extracted photographed image 140a and the subject projected image 142 is increased, which can satisfy "R≧α" in the resemblance degree judging processing S102 executed by the change detecting unit 92, and thus can be judged as "no change" in the building shape (S104).

Next, if the height of a building is changed, a dimension of a side plane thereof appearing on the central projected image along a projection direction of the central projected side plane is changed. For instance, as shown in FIG. 9(b), when the height of the building becomes low, for a side wall plane 130b of a building, which appears on the central projected image 126b of the building of the corresponding feature point image (FIG. 10(b)), a dimension along a projection direction (namely, lateral direction in this drawing) becomes shorter than that of the side wall plane 130a shown in FIG. 10(a). Also, a rooftop 128b may keep the same "L-shaped" shape as that of the rooftop 128a shown in FIG. 10(a). However, a position thereof is moved substantially parallel to the projection direction, because the height of the building becomes low. With respect to the shapes having the above-mentioned relationship, as the moving distance becomes longer, the resemblance degree "R" is decreased. As a consequence, a resemblance degree "R" between the extracted photographed image 140b of the building whose height is changed and the subject projected image 142 may become R<α. In this case, the matching process unit 90 executes a peripheral area searching processing S106. For example, if the matching subject area is set to a left side in FIG. 11(b), then a matching processing S100 is carried out, which reduces a parallel moving distance between a rooftop shape of the extracted photographed image 140b which is extracted from the above-mentioned matching subject area, and a rooftop shape of the subject projected image 142, and hence the resemblance degree "R" can be improved. In a case where the difference value (S−R) between the resemblance degree "S" and the resemblance degree "R" is increased, which is equal to or larger than the threshold value "ω", because the peripheral area is searched, the change detecting unit 92 judges that the height of the building is changed (Step S110). Also, the change detecting unit 92 may predict a change amount of height of a building based upon a moving distance of a matching subject area whose difference value (S−R) becomes maximum.

In contrast to the above-mentioned case, in a case where a planar shape of a building is changed, there is no specific reason why, even when a peripheral area searching operation is carried out, a resemblance degree can be expected to increase significantly. For instance, with respect to an extracted photographed image 140c of a building shown in FIG. 11(c) and a subject projected image 142 thereof, positions and shapes of side wall planes thereof are coincident with each other, but, because a shape of a rooftop 128c is changed, even when the matching subject area is moved along the projection direction by executing the peripheral area searching processing S106, the difference value (S−R) becomes smaller than the threshold value "ω". In this case, the change detecting unit 92 judges a large/small relation between the resemblance degree "R" and the threshold value "β". In the case where β≦R, the change detecting unit 92 cannot determine that the height of the building is changed, and the change detecting unit 92 may judge that a certain shape is changed (Step S114).

On the other hand, in the case where β>R, though not shown in FIGS. 9 to 11, as previously described, the change detecting unit 92 may judge "no relevant building" (Step S116).

The invention claimed is:

1. A building shape change detecting method, comprising:
   a photographing step of photographing a ground surface image from an aircraft;
   an observation feature point extracting step of extracting, on the aircraft, an observation feature point corresponding to a ground object from the photographed ground surface image;
   a data transmitting step of transmitting data representative of the observation feature point from the aircraft to a ground station in a wireless manner;
   a building projected image producing step of performing, at the ground station, a projection calculation based upon (i) building shape recording information which has previously been stored, and (ii) both a flying position and a flying attitude of the aircraft when the photographed ground surface image was photographed, and producing a building projected image as viewed from the flying position; and a change detecting step of comparing, at the ground station, the observation feature point with the building projected image, and detecting a change in the building shape, wherein the observation feature point extracting step extracts pixels as the observation feature points, which constitute an edge, from the photographed ground surface image corresponding to a digital image.

2. The building shape change detecting method according to claim 1, wherein:

the building shape recording information contains three-dimensional data of the building;

the building projected image producing step produces a projected image of a contour of the building based upon the three-dimensional data; and the change detecting step detects both a change in planar shape of the building and a change in height of the building based upon a matching operation executed between the edge extracted from the photographed ground surface image and the projected image.

3. The building shape change detecting method according to claim 2, wherein the change detecting step detects the change in height of the building based upon a difference between a position of the projected image of the building in the building projected image, and a position of an image of the building in the photographed ground surface image along a projection direction related to the projected image.

4. A building shape change detecting system, comprising:

photographing means for photographing a ground surface image from an aircraft;

observation feature point extracting means for extracting, on the aircraft, an observation feature point corresponding to a ground object from the photographed ground surface image;

data transmitting means for transmitting data representative of the observation feature point from the aircraft to a ground station in a wireless manner;

building projected image producing means for performing, at the ground station, a projection calculation based upon (i) building shape recording information which has previously been stored, and (ii) both a flying position and a flying attitude of the aircraft when the photographed ground surface image was photographed, and producing a building projected image as viewed from the flying position; and change detecting means for comparing, at the ground station, the observation feature point with the building projected image, and detecting a change in the building shape, wherein the observation feature point extracting means for extracting pixels as the observation feature points, which constitute an edge, from the photographed ground surface image corresponding to a digital image.

5. The building shape change detecting system according to claim 4, wherein:

the observation feature point extracting means extracts pixels as the observation feature points, which constitute an edge, from the photographed ground surface image corresponding to a digital image;

the building shape recording information contains three-dimensional data of the building;

the building projected image producing means produces a projected image of a contour of the building based upon the three-dimensional data; and the change detecting means detects both a change in planar shape of the building and a change in height of the building based upon a matching operation executed between the edge extracted from the photographed ground surface image and the projected image.

6. The building shape change detecting system according to claim 5, wherein the change detecting means detects the change in height of the building based upon a difference between a position of the projected image of the building in the building projected image, and a position of an image of the building in the photographed ground surface image along a projection direction related to the projected image.

* * * * *